Dec. 16, 1947.  C. A. OVENSHIRE  2,432,792

DETACHABLE HANDLE FOR REVERSIBLE COOKING UTENSILS

Filed Dec. 2, 1946

INVENTOR.
Clyde A. Ovenshire
BY
ATTORNEYS

Patented Dec. 16, 1947

2,432,792

UNITED STATES PATENT OFFICE 2,432,792

DETACHABLE HANDLE FOR REVERSIBLE COOKING UTENSILS

Clyde A. Ovenshire, Berkeley, Calif.

Application December 2, 1946, Serial No. 713,519

4 Claims. (Cl. 16—114)

The present invention relates to cooking utensils such as skillets, pots, griddles and the like.

Cooking utensils of this type require usually some manual holding member so that they may be manipulated while subjected to heat, and may be carried to places of use while hot. However, once they have been placed into proper position over a fire or on a service table, such holding members prove a disadvantage because they take up space which may reduce the number of cooking utensils that can be accommodated by a limited space such as a baking oven; most troublesome, however, is the fact that such holding members are liable to heat up as much as the cooking utensils of which they form a part, thus rendering manipulation difficult, if not impossible, even if provided with handles of non-conducting materials, such as wood.

The present invention relates specifically to modern cooking utensils of the type wherein either side is adapted to be used for a cooking process of a particular kind; for instance, one side may be formed into a skillet or frying pan while the other side may be adapted for use as a griddle. Since such modern utensils are frequently made of light weight metals such as aluminum, not only to reduce their weight but also to utilize the heat conduction qualities of these metals to reduce the heating period and secure evenness of heat distribution, their handles are particularly apt to become hot and difficult to manipulate.

Broadly it is an object of the present invention to provide methods and means for conveniently handling a reversible double-purpose utensil of the type referred to.

More specifically, it is an object of the present invention to provide a double-purpose cooking utensil of the reversible type having a detachable handle affording equal dependability and convenience in use no matter which side of the utensil is turned up.

It is an additional object of the present invention to provide a construction for a reversible double-purpose cooking utensil and its associated detachable handle, adapted to secure identical coaction between detachable handle and cooking utensil in either of the two positions of the latter.

It is another object of the present invention to provide a metallic cooking utensil of the type referred to, which while adapted for manipulation by a detachable handle in either of its two positions, is of such simple construction that it may readily be cast in a single piece.

It is a specific object of the present invention to provide a reversible cooking utensil presenting a pan surface when one of its two sides is turned up, and a griddle surface when the other side is up, and which is adapted to hold or release a detachable handle with the same degrees of reliability and ease, respectively, in either of its two positions of use.

It is yet another object of the present invention to provide a handle attaching member for cooking utensils of the reversible type adapted to hold or release a detachable handle with equal ease and dependability, respectively, whether in upright position, or turned upside down.

Furthermore, it is an object of the present invention to provide a detachable handle for reversible cooking utensils of the type referred to, which is adapted to hold the cooking utensil firmly yet is instantly detachable no matter which side of the utensil is turned up.

These and other objects of my invention will be apparent from the following description of the accompanying drawing which illustrates a preferred embodiment thereof and wherein.

Figure 1:
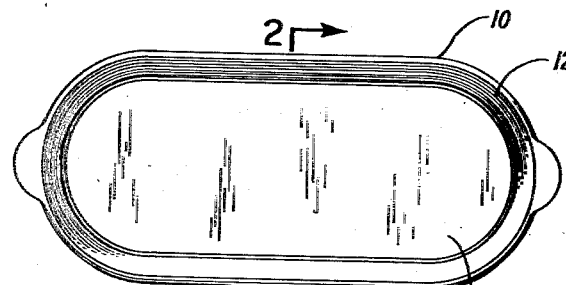
Figure 1 is a plan view of a double-purpose cooking utensil constructed in accordance with my invention, presenting a side which is formed into a skillet or pan.
Figure 2:
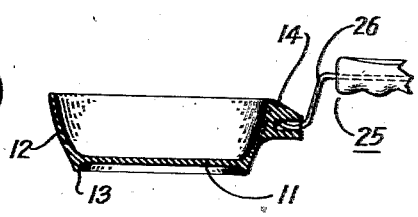
Figure 2 is a cross-sectional view of the cooking utensil in the same position as shown in Figure 1 taken along line 2—2 thereof.
Figure 3:
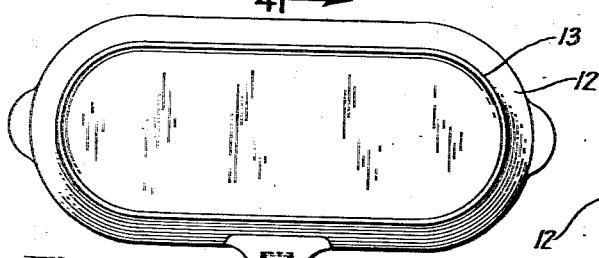
Figure 3 is a plan view, similar to Figure 1, of the same cooking utensil presenting its opposite side, which is formed in the manner of a griddle.
Figure 4:
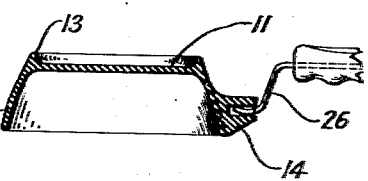
Figure 4 is a cross-sectional view, similar to Figure 2, taken along line 4—4 of Figure 3.
Figure 5:
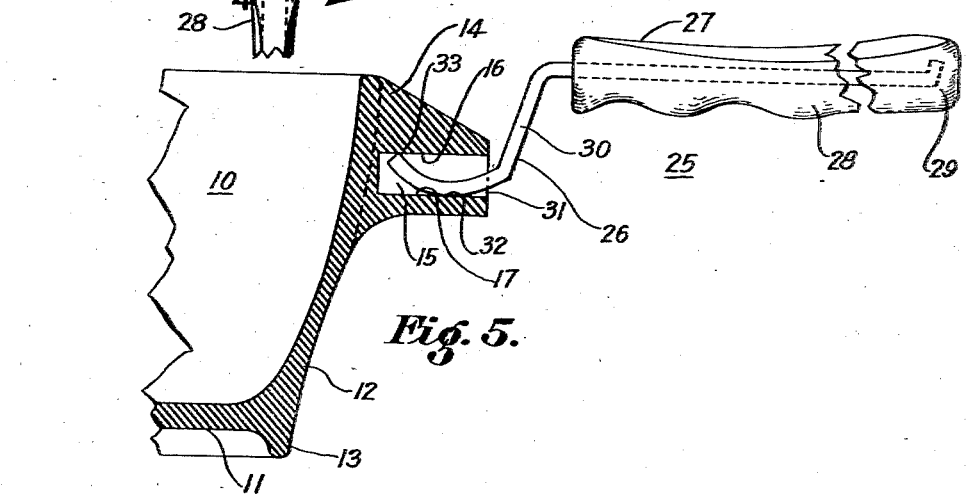
Figure 5 is an enlarged detail view of the handle and of the handle attaching member provided on the utensil, the latter being in the position illustrated in Figures 1 and 2.

The cooking utensil 10 illustrated in the drawing has a flat bottom 11 which may be of elongated oval shape as shown. The bottom 11 is surrounded by a suitably flared side wall 12 of sufficient depth to form a frying pan or skillet at one side thereof, while a relatively narrow rim 13 surrounds the opposite side of the bottom to form a griddle. Figures 1, 2 and 5 show the cooking utensil with its skillet side up whereas Figures 3 and 4 illustrate the utensil with its griddle side turned for use.

The side wall 12 is provided with a radially projecting member or shank 14 which may be secured to the utensil in any suitable manner such as by rivets but is preferably cast as an integral part thereof. The shank may be of a tapering rectangular shape as shown; it will be understood, however, that it may be made of any other shape to fit into whatever design a particular cooking utensil may be given for reasons of appearance. Shank 14 is provided with a socket or recess 15 of rectangular cross section and which has parallel horizontal top and bottom surfaces 16 and 17 as shown in Figures 2, 4 and 5.

The detachable handle 25 comprises a metal stem 26 of bar shape which has a straight horizontal portion 27 upon which is mounted a suitably shaped cover 28 of insulating material as shown in Figure 5. The cover 28 may be made of wood, or it may be made of some appropriate plastic moulded directly around the horizontal portion 27 of the stem, and for this purpose the end of the stem may be bent or flared as shown at 29 to properly anchor the stem within the cover. To preclude rotary movement of stem and cover relative to one another, the stem is preferably of a certain width transversely as can best be seen from Figures 1 and 3.

Adjoining its horizontal portion 27 the metal stem 26 has a descending portion 30 which terminates into a horizontally positioned shallow arc or hook 31, and forms an upwardly directed edge 33 at its extreme end as may be best seen from Figure 5.

The recess or socket 15 in the shank 14 and the arcuate hook 31 of the handle stem are so proportioned relative to one another that the vertical width of the former and the segmental depth of the latter are roughly alike, with the recess 15 being preferably somewhat wider vertically to facilitate insertion of the handle end. Furthermore, the horizontal depth of recess 15 as established by the length of the parallel surfaces 16 and 17, radially of the cooking utensil, should at least be one half of the chord pertaining to the arc of the handle end 31 so that either of the horizontal walls is adapted to form a bearing for the rocker surface 32 represented by the bottom area of arcuate hook 31. Also, the transverse width of the recess 15 should be such as to fit snugly the cooperating portion 31 of the bar-shaped handle stem 26 so as to prevent lateral tilting of the cooking utensil relative to the handle.

When the cooking utensil 10 is to be moved, the arcuate end 31 of the handle 25 is inserted into the rectangular recess 15 of the handle attaching shank 14 sufficiently far for its rocker surface 32 to rest upon whatever may be the lower one of the horizontal surfaces 16 and 17 at the time. The protruding end of the handle is then rocked down until the edge 33 at the inner end thereof strikes against the upper surface of the recess 15 as shown in Figure 5. To increase the dependability of the engagement between handle 26 and the shank 14, the edge 33 at the inner end of the arcuate hook 31 may be somewhat sharpened so that it will bite into the coacting horizontal surface of the socket 15. Also, when the cooking utensils are made of light weight metals such as aluminum or aluminum base alloys, it will be of advantage to make the handle stem from a harder material, such as steel. Alternatively, both of the horizontal surfaces 16 and 17 of the socket 15 may be provided with vertically aligned recesses (not shown) adjacent to the inner end of the socket and adapted to receive the pointed end of the arcuate hook 31.

Due to the symmetrical configuration of the socket 15 with respect to a bisecting horizontal plane, and also due to the above described dimensional relationship between the recess of the socket and the arcuate hook of the handle, the operating end of the handle may be inserted into the recess 15, and both recess and handle will cooperate in an identical manner to establish a firm hold, no matter which side of the cooking utensil is turned up; and when it is desired to detach the handle, slight rocking of its exterior portion in upward direction will disengage the edge 33 of its arcuate hook 31 from the cooperating socket wall so that the handle may easily be removed, whether the skillet side or the griddle side of the cooking utensil is in use at the time.

Thus with the arrangement of my invention, it is immaterial which of the two sides of a double-purpose cooking utensil is turned up. In either position its handle can quickly be attached so that the utensil can be manipulated or moved safely without discomfort to the operator's hand; and, vice versa, once a cooking utensil constructed in accordance with my invention has been properly located, the handle may easily be detached therefrom without the application of force that may endanger the contents of the vessel, and without need for the operator to move his hand into the heated zone above the utensil.

An added advantage of the structure resulting from the above described arrangement is the extreme simplicity thereof which permits the cooking utensil including its handle attaching shank, to be cast in a single piece.

Having thus described my invention and the manner in which it is to be performed, what I claim is:

1. In a utensil of the class described the combination, with a handle attaching shank rigidly secured to said utensil and having a socket symmetrical with respect to a bisecting horizontal plane, of a handle member having a hook shaped end removably engageable with said socket in either upright or inverted position of said utensil, engagement and removal of said handle member from said socket being effected by rocking movement of said handle member in a vertical plane.

2. Arrangement according to claim 1 wherein said socket has parallel top and bottom surfaces, and wherein the hook-shaped end of said handle member has the form of a shallow arc, the vertical space between said surfaces being slightly larger than the segmental depth of said arc.

3. Arrangement according to claim 1 wherein said socket is of rectangular cross-section having parallel top and bottom surfaces, and wherein the hook-shaped end of said handle member has the form of an arc, the depth of said socket surfaces, radially of said utensil, being at least half the length of the chord pertaining to said arc.

4. Arrangement according to claim 1 wherein said handle member is made of a harder material than said handle attaching shank, the end of said hook-shaped portion being formed into a cutting edge for biting engagement with the walls of said socket.

CLYDE A. OVENSHIRE.

REFERENCES CITED

The following references are of record in the file of this patent:

UNITED STATES PATENTS

| Number | Name | Date |
| --- | --- | --- |
| 207,974 | McConnell | Sept 10, 1878 |
| 736,749 | Lenderking | Aug. 18, 1903 |
| 1,015,022 | Harrison | Jan. 16, 1912 |
| 1,308,151 | Vogel | July 1, 1919 |
| 2,042,773 | Feldman | June 2, 1936 |
| 2,072,569 | Shoan | Mar. 2, 1937 |
| 2,133,252 | Moore et al. | Oct. 11, 1938 |
| 2,242,779 | Erdos | May 20, 1941 |
| 2,262,302 | Sinclair | Nov. 11, 1941 |